United States Patent
Gross, Jr. et al.

[11] Patent Number: 6,155,300
[45] Date of Patent: Dec. 5, 2000

[54] DIVERT VALVE

[75] Inventors: Bernard W. Gross, Jr., Bristol; Harry R. Zirkle, Pleasant Prairie; Ricky A. Leffelman, Grantsburg, all of Wis.

[73] Assignee: Stainless Products, Inc., Somers, Wis.

[21] Appl. No.: 09/300,573

[22] Filed: Apr. 27, 1999

[51] Int. Cl.[7] .................................................. F16K 11/02
[52] U.S. Cl. ...................................... 137/872; 137/625.48
[58] Field of Search ............................... 137/625.48, 872

[56] References Cited

U.S. PATENT DOCUMENTS

| | | | |
|---|---|---|---|
| 1,594,052 | 7/1926 | Draver | 137/625.48 |
| 1,623,580 | 4/1927 | Draver | 137/625.48 |
| 2,905,197 | 9/1959 | Janes . | |
| 3,025,712 | 3/1962 | Spar et al. | 137/625.48 |
| 3,185,178 | 5/1965 | Fiala et al. | 137/625.48 |
| 3,620,256 | 11/1971 | Trythall | 137/625.48 |
| 3,907,374 | 9/1975 | Steele | 137/872 |

*Primary Examiner*—John Fox
*Attorney, Agent, or Firm*—Andrus, Sceales, Starke & Sawall, LLP

[57] ABSTRACT

A three-way divert valve has a body assembly including first and second axially aligned ports and a third port extending generally perpendicularly to the first and second ports. A flow control member is slidably positioned for linear movement within the body assembly for selectively regulating flow through the first, second and third ports. The flow control member has a first structure for permitting normal flow between the first and second ports, and a second structure for diverting flow from the first port to the third port. The first structure is comprised of a generally cylindrical disc slidably mounted within the body assembly below the first and second ports during normal flow, and the second structure is comprised of a baffling surface extending downwardly from the disc and terminating at a lower portion of the body assembly.

15 Claims, 8 Drawing Sheets

DIVERT VALVE

FIELD OF THE INVENTION

This invention relates broadly to a valve for controlling flow of material from one location to another and more particularly, pertains to a divert valve used in regulating flow of a dairy food product, such as cheese curd, during the processing thereof.

BACKGROUND AND SUMMARY OF THE INVENTION

In the preparation of certain foodstuffs where high standards of sanitation are necessary, it is customary to employ flow control valves constructed of stainless steel. Such valves have a high surface finish which is necessary to minimize the adherence of material and facilitate the frequent cleaning of disassembled valve parts.

When processing cheese curds, it is desirable to utilize a stainless steel valve in an automatic metal detect and divert system which normally allows forced air flow of cheese curd material from one processing station to another. Such a system is designed to automatically detect the presence of unwanted metal particles which sometimes appear in the process line from rust particles in water or from fragmented pieces of processing equipment. Upon detection of the contaminating metal, the system relies upon a divert valve for temporarily shifting the flow of material with the offending metal to a separate flow path, such as a refuse container. The divert valve must be responsive so as not to waste more material than is necessary.

It is known that there exists stainless steel ball valves which provide for three-way or diverted flow, such as disclosed in U.S. Pat. No. 2,905,197 issued Sep. 22, 1959 to Janes. In this type of valve, a generally spherical ball valve plug is rotatably mounted in a seating arrangement to control flow between two of the three passageways. Such a ball valve, however, is generally designed for liquid flow and is unsuitable for the processing of generally solid chunks of cheese curd. That is, the torsion control required for the ball valve would result in a poorly responsive valve which is liable to clog and cease to function. In addition, it is common knowledge that ball valves need to be completely disassembled when used in the handling of foodstuffs where cleaning is frequently required.

Given the nature of the lump-like cheese curds and the particular manner in which they are conveyed by forced air, it is desirable to provide a stainless steel divert valve which will efficiently act to instantaneously divert flow in accordance with a sensed condition that is, in this application, the presence of metal contaminant invading the process line. It is also desirable to provide a divert valve which may be cleaned in place without requiring disassembly of the valve. It is further desirable to provide a divert valve which may be adapted for controlling flow of liquid and liquid and solid mixtures of various viscosity, It is a general object of the present invention to teach a divert valve having a fast acting, linearly movable flow control member.

It is also an object of the present invention to teach a divert valve having no internal voids, crevices or screwthreads which will result in clogging.

It is a further object of the present invention to teach a divert valve which allows for cleaning in place (CIP) without requiring disassembly.

Yet a further object of the present invention is to teach a divert valve having a particularly configured flow control member conducive to improve flow diversion.

Still another object of the present invention is to teach a divert valve which enables efficient transfer of processed cheese curd.

It is also an object of the present invention to provide a stainless steel divert valve which avoids the use of a torsion controlled ball flow member.

Still yet another object of the present invention is the provision of a stainless steel divert valve which is responsive to a sensed condition and which is automatically actuated.

In one aspect of the present invention a divert valve includes a hollow body assembly having first and second ports axially aligned, and a third port extending generally perpendicularly to the first and second ports. A plug assembly is slidably mounted for linear movement within the valve body assembly. An actuator assembly is positioned exteriorly of the body assembly and is operably connected with the plug assembly such that in one position, the plug assembly allows communication between the first and second ports, and in a second position, the plug assembly allows communication between the first and third ports. The body assembly has a generally cylindrical inner wall, an open top and an open bottom for forming the third port. The body assembly further includes a pair of outwardly projecting ears, one of the ears defining the first port and the other of the ears defining the second port. The plug assembly includes a generally cylindrical disc slidably mounted relative to the inner wall of the body assembly for linear movement along the longitudinal axis, a pair of parallel, spaced apart stems extending upwardly from the disc and a baffling surface projecting downwardly from the disc. The baffling surface has a partial, cylindrically shaped rear surface and a downwardly sloping front surface. The downwardly sloping front surface includes a central triangularly shaped region provided with a pair of outwardly sweeping wings. The actuator assembly includes a cylinder housing having an inner wall, a cover attached to a top portion and a foot connected to a bottom portion by a first circular clamp. A piston is slidably mounted for linear movement along longitudinal axis in the cylinder housing, the piston being provided with a downwardly extending rod projecting through the foot. The rod has a free end connected to an actuating arm which is connected to the stems of the plug assembly.

The divert valve also includes a bonnet assembly extending between the body assembly and the actuator assembly. The bonnet assembly includes a circular base and a generally cylindrical tower projecting upwardly therefrom, the tower having open sides and a top ring which is lockingly engageable with the actuator assembly foot by means of a second circular clamp. The base is attached to the open top of the body assembly by a third circular clamp and is formed with a pair of diametrically opposed openings through which the plug assembly stems pass. A first sealing device is interposed between the base of the bonnet assembly and the open top of the body assembly. Second and third sealing devices are positioned between the piston and the inner wall of the cylindrical housing.

In another aspect of the invention, there is disclosed a three-way, flow valve having a body assembly including first and second axially aligned ports and a third port extending generally perpendicular to the first and second ports. The improvement resides in a flow control member slidably positioned for linear movement within the body assembly for selectively regulating flow through the first, second and third ports. The flow control member has a first structure for permitting normal flow between the first and second ports, and a second structure for diverting flow from the first port to the third port. The first structure is comprised of a generally cylindrical disc slidably mounted within the body assembly below the first and second ports during normal flow. The second structure is comprised of a baffling surface extending downwardly from the disc and terminating at a lower portion of the body assembly. With flow diverted, the disc is movable linearly above the first and second ports and the baffling surface is movable from the lower portion of the body assembly to a position between the first and second ports.

In yet another aspect of the invention, a flow control divert valve is provided for normally regulating material flow from a source to a first processing station, and diverting material from the source to a second processing station in response to a sensed condition downstream of the source. The divert valve includes a body assembly having an inlet port in communication with the source, a first outlet port in communication with the first processing station and a second outlet port in communication with the second processing station. A flow controlling plug assembly is slidably and non-rotatably mounted for movement along a longitudinal axis of the body assembly. The plug assembly includes a generally cylindrical disc over which material normally flows from the source to the first outlet port and first processing station. The plug assembly further includes a baffling surface depending from the disc, the baffling surface being constructed and arranged to selectively divert material flow from the source to the second outlet port and second processing station in response to the sensed condition downstream of the source. A fluid-actuated actuator assembly is associated with the body assembly and responsive to the sensed condition. The actuator assembly has a closed cylinder, a piston slidably mounted for linear movement in the cylinder, and a piston rod operably connected between the piston and the plug assembly disc. A first fluid intake is provided for selectively admitting fluid on one side of the piston, and a second fluid intake is provided for selectively admitting fluid on an opposite side of the piston. The admission of fluid causes the linear movement of the piston to be translated to linear movement of the plug assembly so as to selectively enable flow between the first processing station and the second processing station. At least the body assembly and the plug assembly are constructed of stainless steel.

The above and other objects and advantages of the present invention will become more apparent from the following description, claims and drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1A:
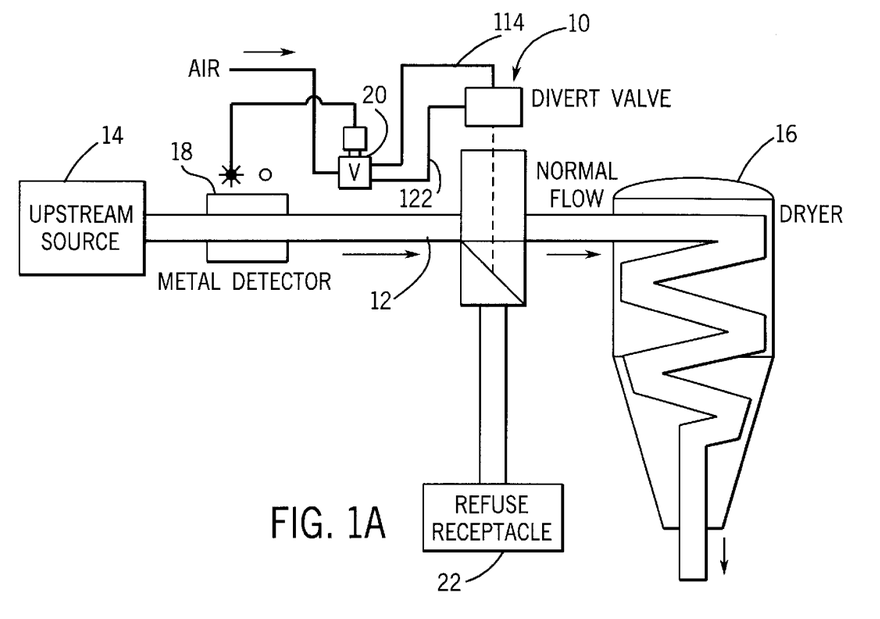
FIG. 1A is a diagrammatic view of an automatic metal detect and divert system employing the divert valve of the present invention to direct normal flow from an upstream source to a downstream dryer.

The present invention provides a three-way divert valve 10 which has particular utility in the forced air transfer of cheese curd chunks in an enclosed processing line 12. In the preferred embodiment, the divert valve 10 is incorporated in an automatic metal detect and divert system such as illustrated in FIG. 1A. A system of this type is designed so that cheese curd will normally flow from a first processing station or upstream source 14 through the divert valve 10, and onto a second processing station such as a dryer 16 downstream.

Typically, such first processing station 14 may be embodied in a moving metallic table or some type of metal processing equipment. Upstream processing of the cheese curd may also involve the use of water such that as the cheese curd travels into the forced air line, small pieces of metal from the metallic table, processing equipment, or rust particles from the water may contaminate the cheese curds. In order to prevent the continued transfer of these metal contaminants, a commercially available metal detector is positioned at the beginning of the line 12 and is operably connected to a supply of pressurized air and an air solenoid 20 which, in turn, is coupled to the divert valve 10.

Figure 1B:
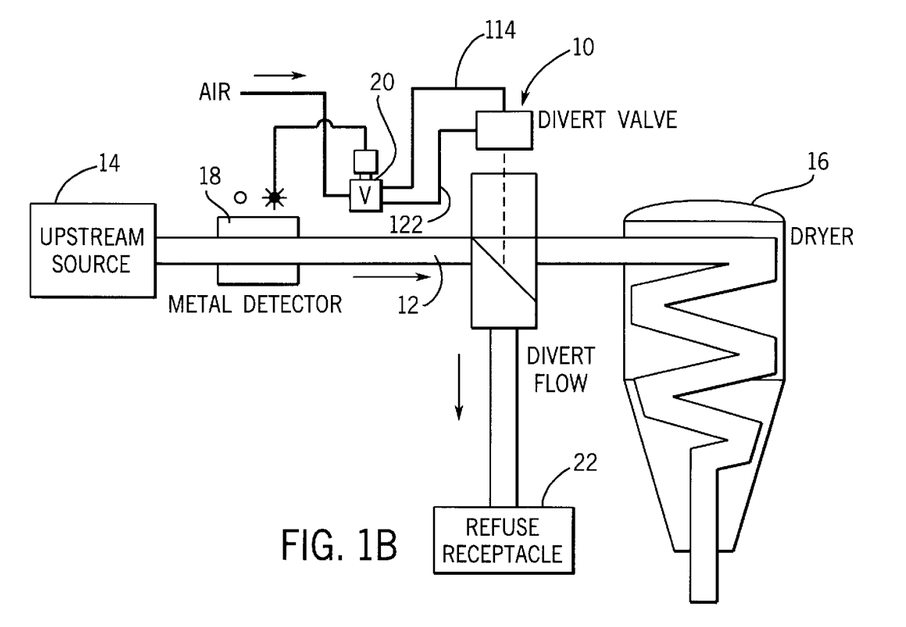
FIG. 1B is a view similar to FIG. 1A but showing the divert valve diverting flow such as to a refuse container.

Referring to FIG. 1B, when the metal detector 18 signals the presence of unwanted metal, the divert valve 10 responds quickly to this sensed condition and operates to temporarily divert the flow of cheese curds with the offending metal contaminant to a third processing station 22, such as a refuse container. Unless there is further metal detection, the divert valve 10 is actuated back to the normal flow condition of FIG. 1A such that the uncontaminated cheese curds proceed to the dryer 16.

At the outset, it should be understood that while the present invention is used with solid cheese curds accompanied by a minimum of fluid from water or whey, the divert valve 10 may be adapted to be used in other applications involving liquid or liquid-solid mixture for material flow.

Figure 2:
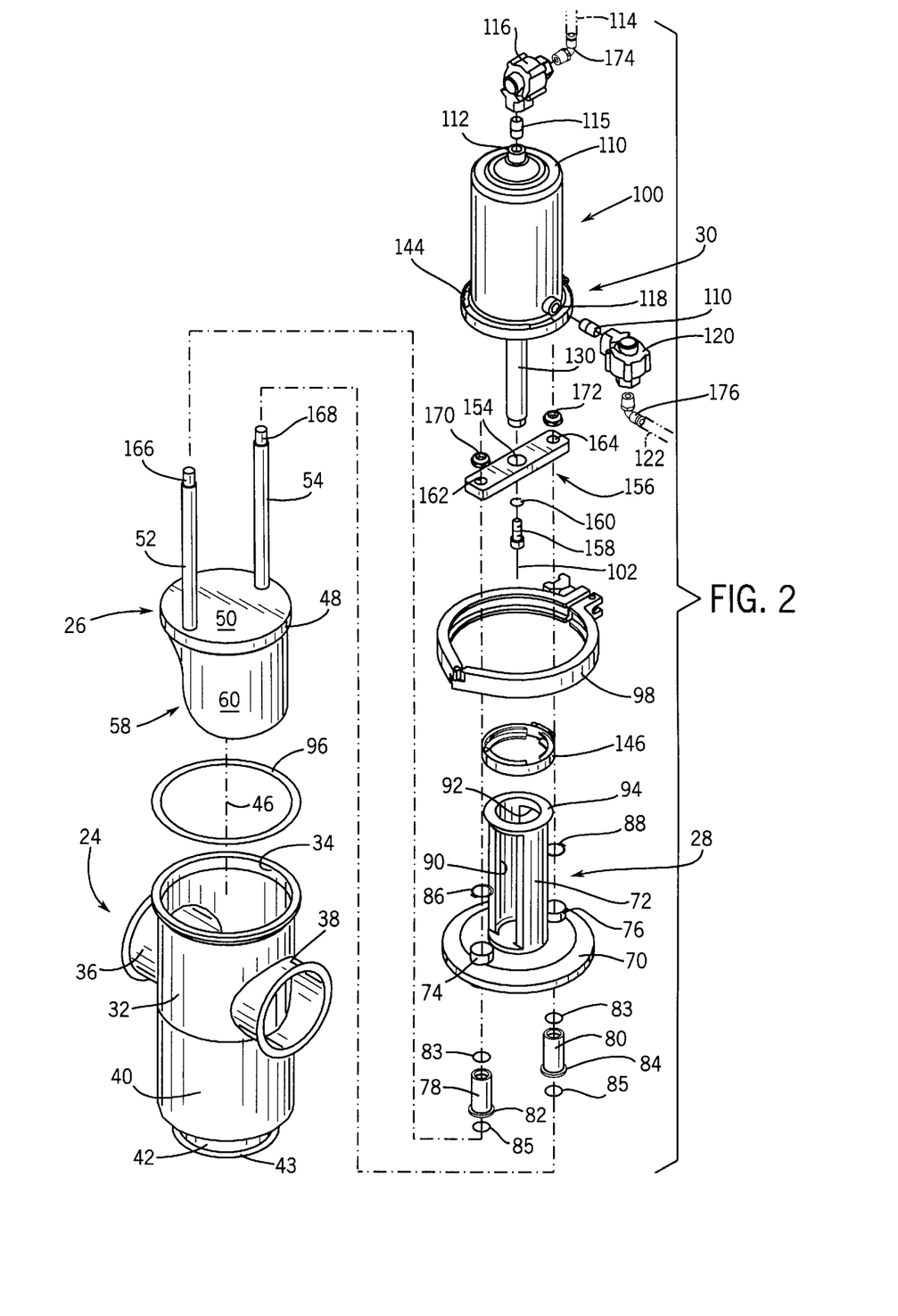
FIG. 2 is an exploded view of the divert valve.

As best shown in FIG. 2, the divert valve 10 is comprised of four major sub-assemblies namely, a hollow body assembly 24, a plug assembly 26, a bonnet assembly 28 and an actuator assembly 30.

Figure 5:
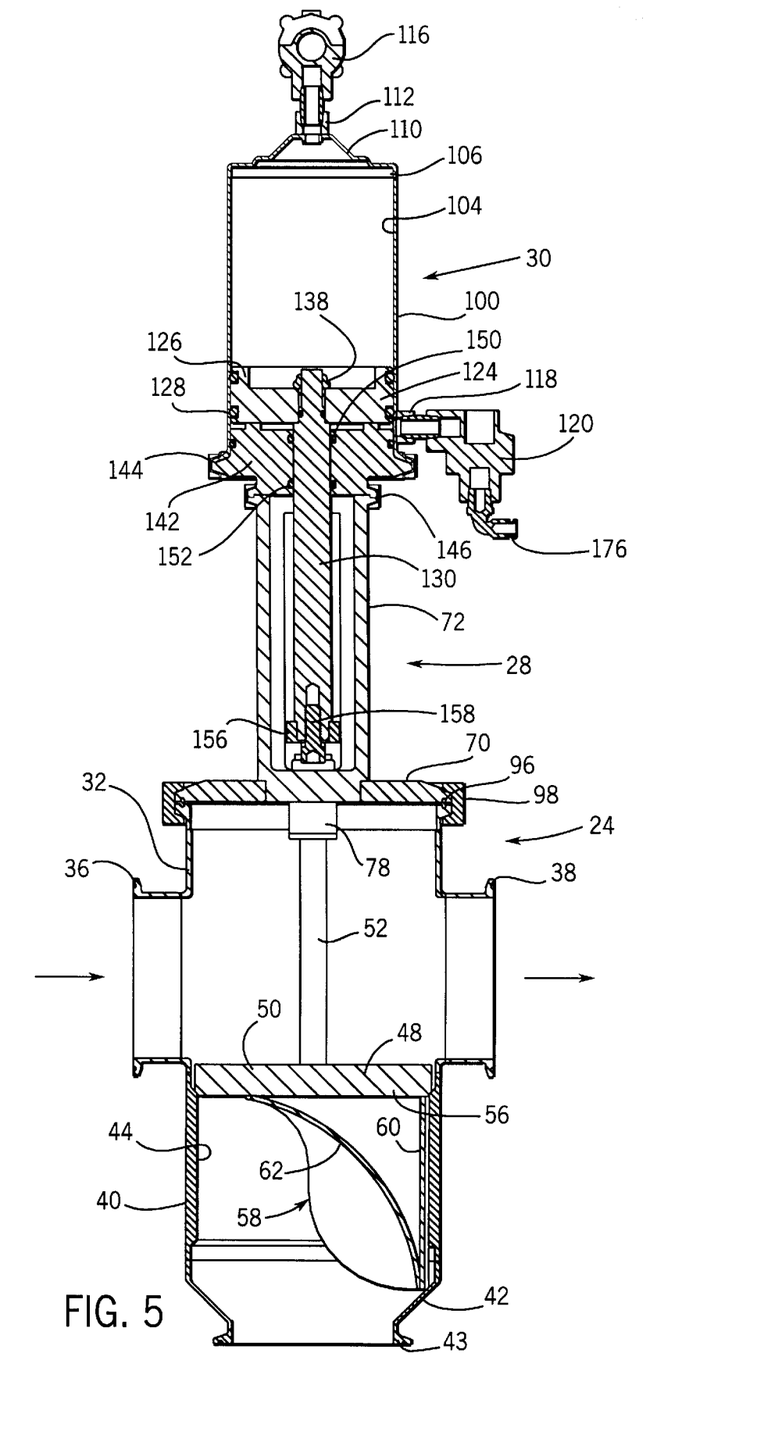
FIGS. 5 and 6 are respective cross-sectional views of the divert valve in normal and divert flow positions.
Figure 6:
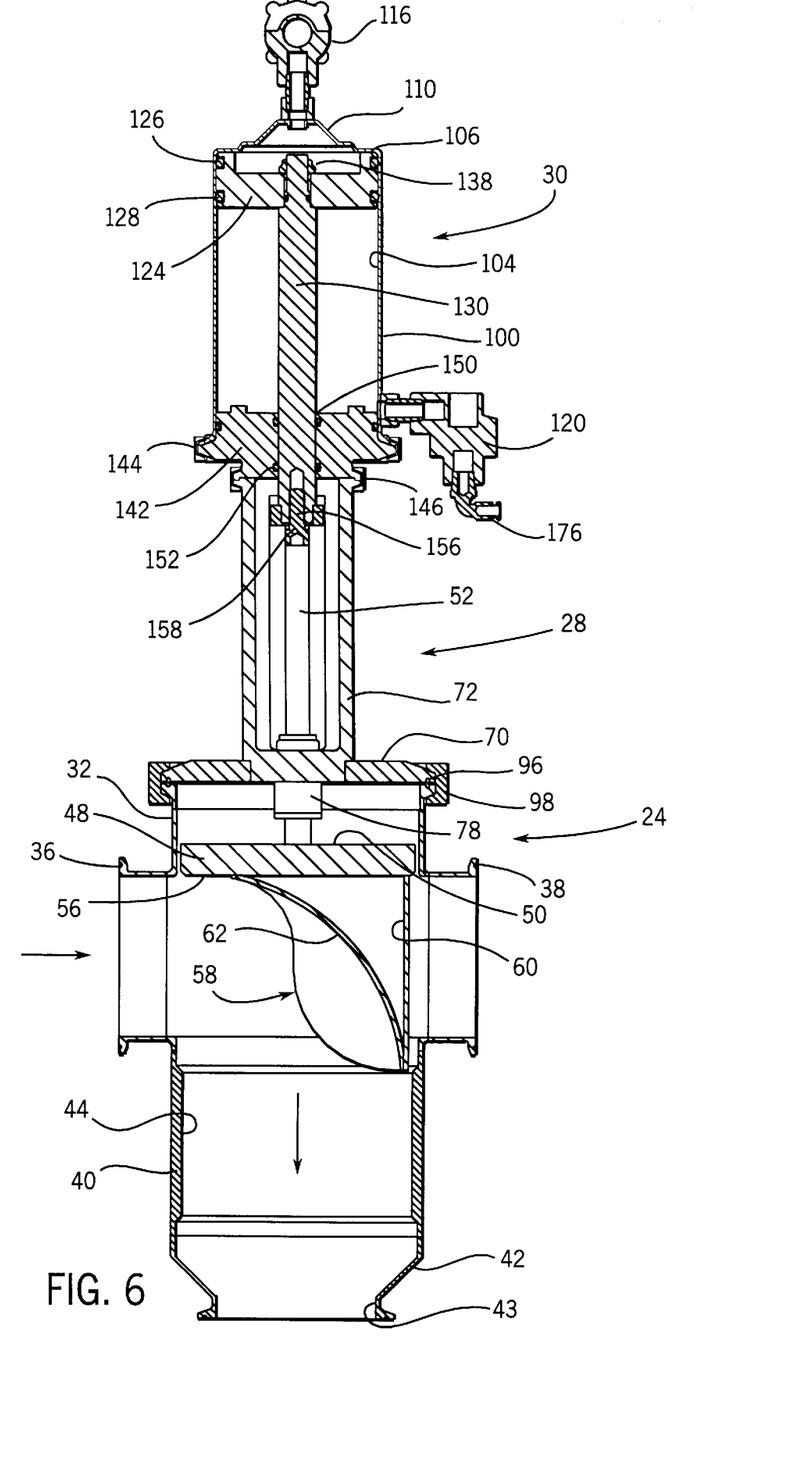
Figure 7:
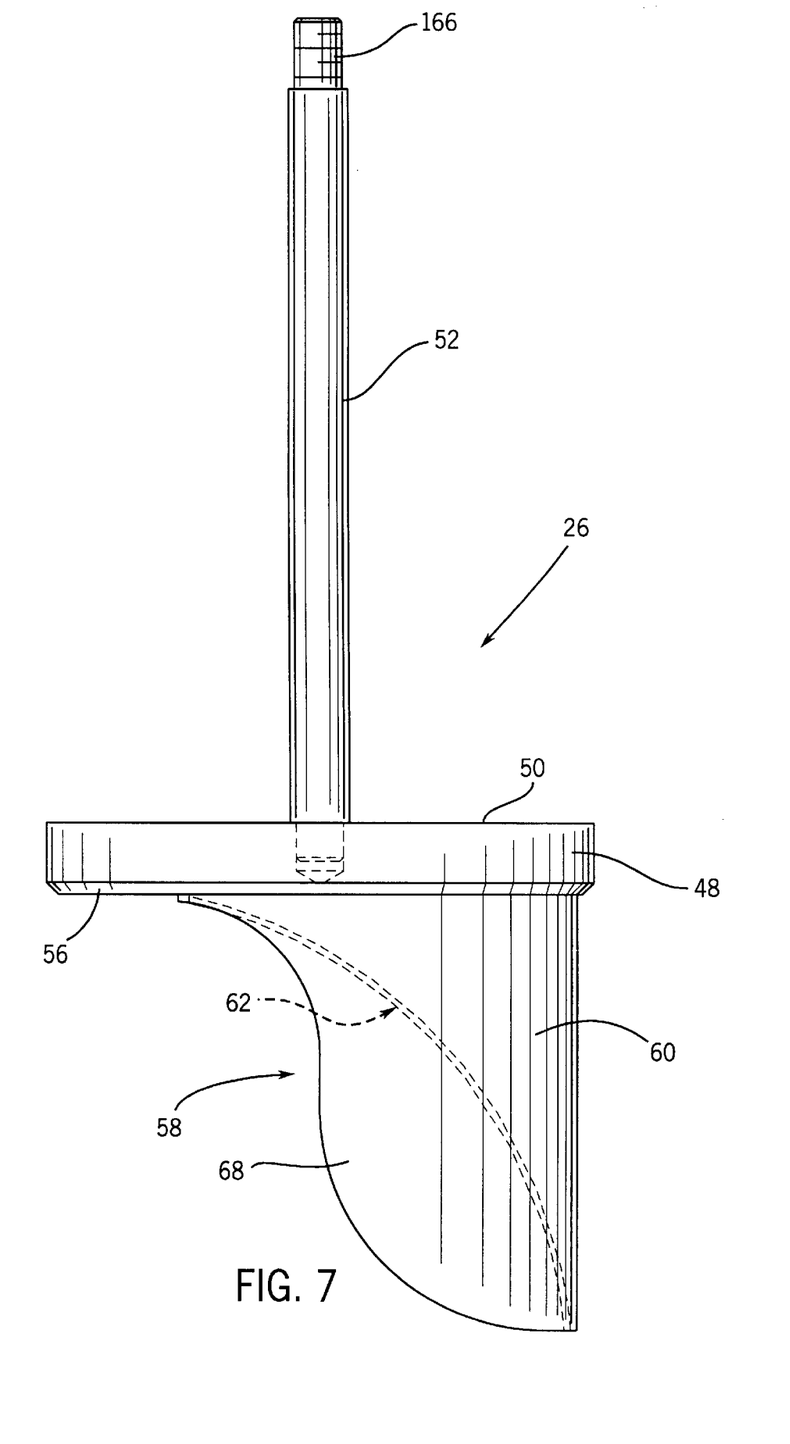
FIG. 7 is an elevational view of a plug assembly employed in the divert valve.
Figure 8:
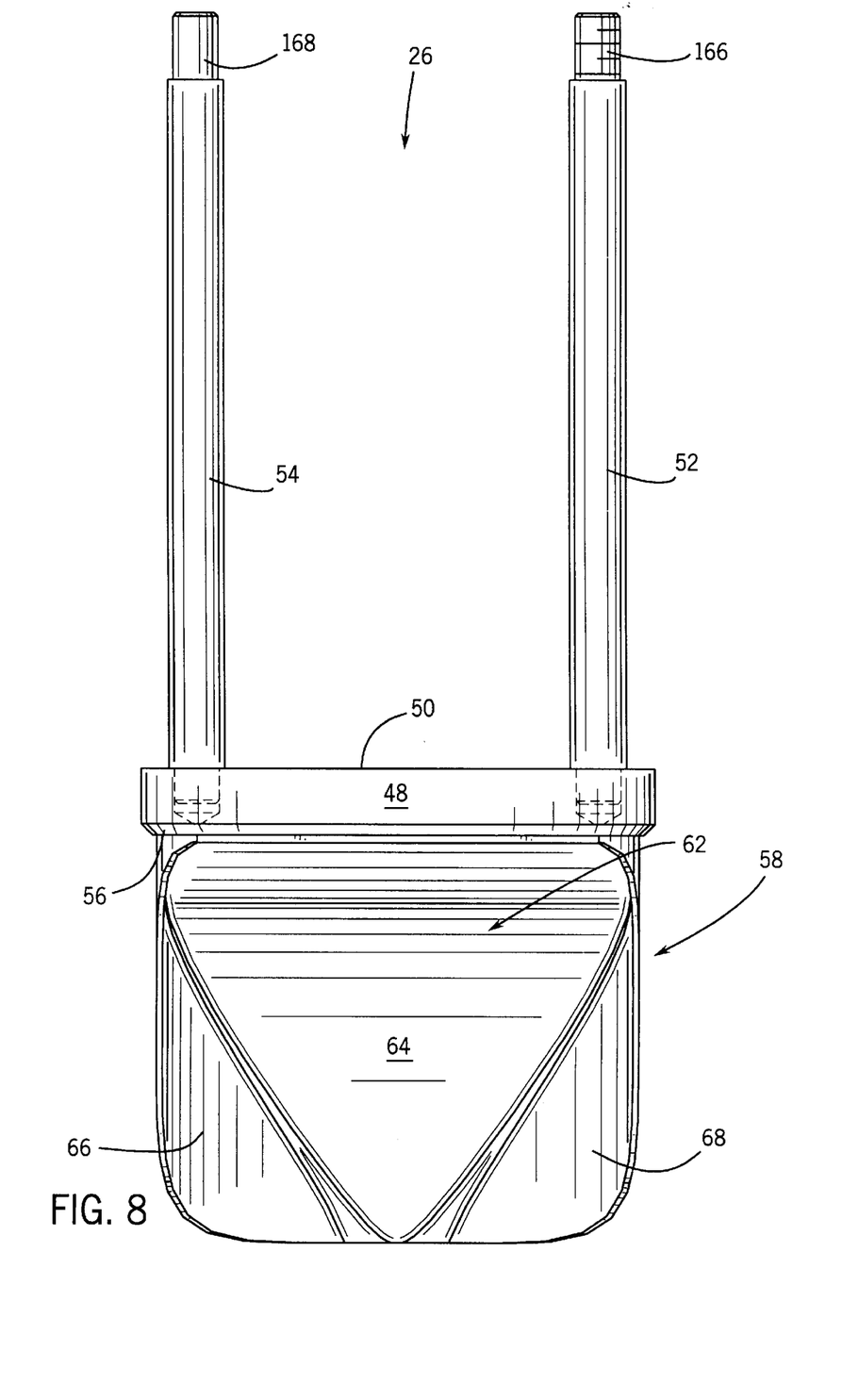
FIG. 8 is a front elevational view of the plug assembly.

With reference to FIGS. 2, 5 and 6 body assembly 24 includes a generally cylindrical upper half 22 provided with a circular crown 34 defining an open top. Projecting outwardly from a recess on each side of the upper half 32 are generally cylindrical ears 36 and 38 respectively. The ears 36,38 are axially aligned with each other and define respective first and second ports which communicate with the interior of the upper half 32. A generally cylindrical lower half 40 is positioned beneath the upper half 32 in mating relationship therewith, and is provided with an inwardly and downwardly tapering base 42 which defines an open bottom and a third port 43 extending generally perpendicularly to the first and second ports 36,38 respectively. The ears 36,38 and the base 42 are adapted to be coupled to closed line 12 such as depicted in FIGS. 1A and 1B. Typically, the upper half 32, ears 36,38, crown 34, lower half 40 and base 42 are fusion welded together to collectively form the body assembly 24 which has a generally cylindrical inner wall 44 surrounding its longitudinal axis 46.

With further reference to FIGS. 5–8, plug assembly 26 includes a generally cylindrical plug or disc 48 having a diameter slightly smaller than the inner wall 44 of the body assembly 24 so as to be slidably accommodated therein without contacting the inner wall of the body assembly. Extending upwardly from a planar upper surface 50 of the disc 48 is a pair of parallel, spaced apart stems 52,54. Projecting downwardly from a planar bottom surface 56 of the disc 48 is a particularly shaped baffling surface 58 which serves as a flow diverter as will be understood hereafter. The baffling surface 58 has a partial cylindrically shaped rear surface 60 and a downwardly curved or sloping front surface 62 having a central triangularly shaped region 64. This latter region is flanked on each side by a pair of outwardly sweeping wings 66,68. It should be appreciated that the plug assembly 26 is designed for linear sliding actuation within the interior of the body assembly 24 and occupies one position in a normal flow condition (FIG. 5) and another position in a divert flow condition (FIG. 6).

The bonnet assembly 28 extends between the body assembly 24 and the actuator assembly 30. The bonnet assembly 28 includes a circular base 70 and a generally cylindrical tower 72 projecting upwardly therefrom. The base 70 is formed with a pair of diametrically opposed upstanding bosses 74,76 defining opening for receiving a pair of bonnet bushings 78,80. These bushings have radiantly enlarged heads 82,84 formed on the lower end of the bushing bodies, so that they will be retained against the bottom of the base 70 when the bushing bodies are inserted into their respective bosses 74,76. The bushings 78,80 carry upper and lower bushing O-rings 83,85 respectively, and are retained in place in the bosses 74,76 by means of retaining rings 86,88. The tower 72 has open sides 90,92 formed in its sidewall and a top ring 94 which is adapted to be fixed to the bottom of the actuator assembly 30.

The bottom of the base 70 is suitably sized such that it will fit over the open top of the body assembly 24. That is, with the plug assembly 26 seated in the bottom of the body assembly 24, the base 70 of the bonnet assembly 28 is positioned over a sealing gasket 96, and placed over the crown 34 of the body assembly 24, the upper end of the stems 52,54 passing through the bonnet bushings 78,80 and projecting from the tops thereof. Bushings 78,80 serve as guideways for the stems 52,54 as the plug assembly 26 moves up and down in the body assembly 24. A heavy duty, circular clamp 98 connects the base 78 of the bonnet assembly 28 to the crown 34 or top of the body assembly 24.

Figure 3:
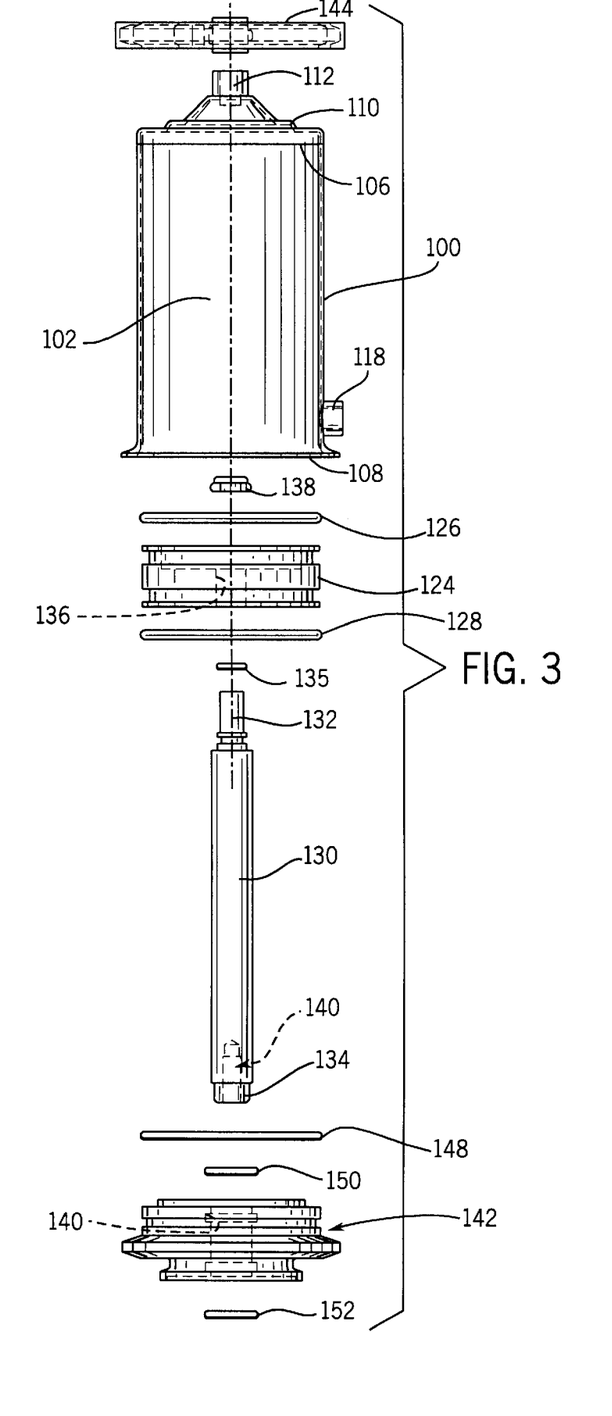
FIG. 3 is an exploded view of an actuator assembly utilized in the divert valve.
Figure 4:
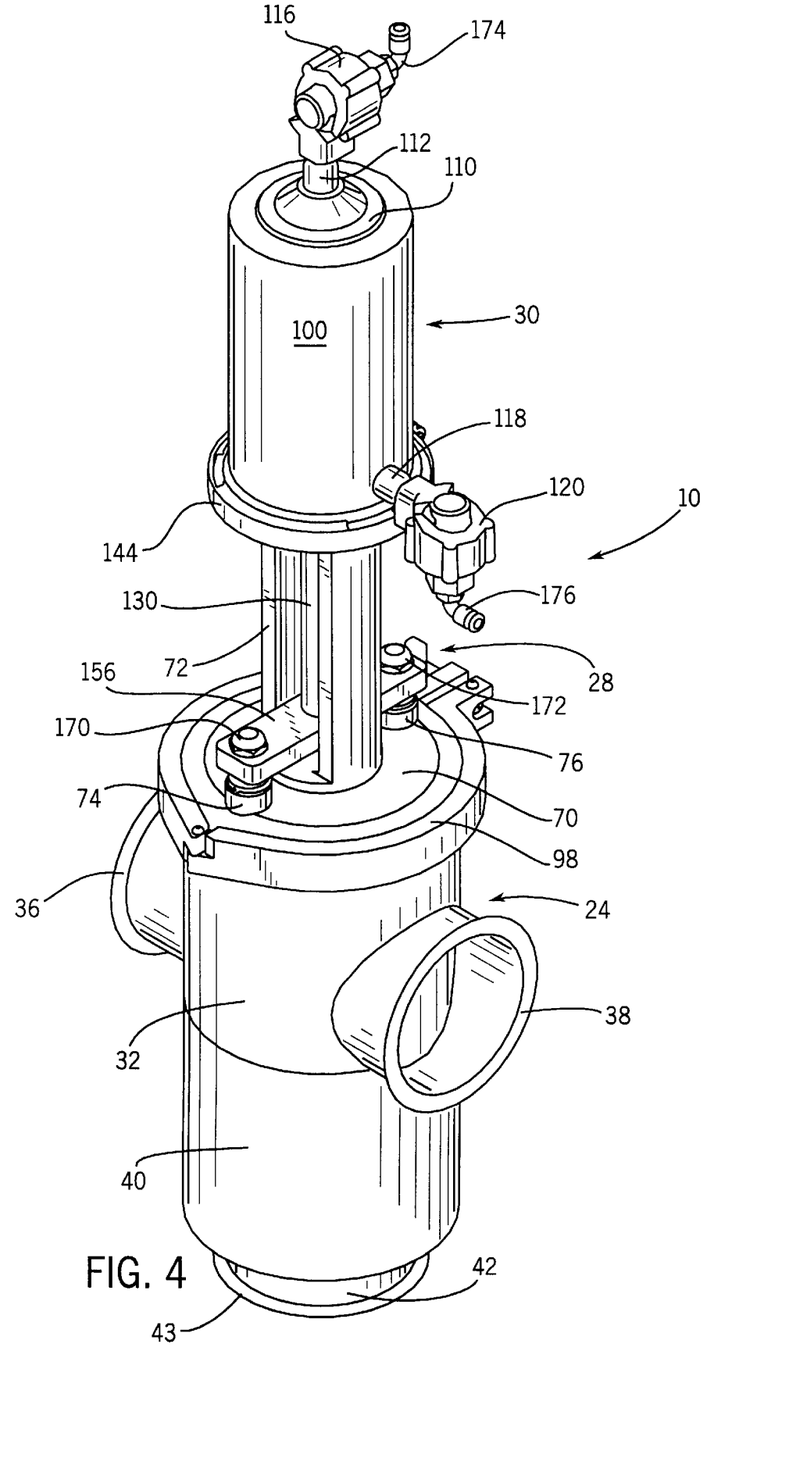
FIG. 4 is a perspective view of an assembled divert valve.

Turning now to FIG. 3, the actuator assembly 30 is utilized to selectively move the plug assembly 26 up and down in the body assembly 24. In the preferred embodiment, the actuator assembly 30 is air actuated and is connected with the air solenoid 20 and the air supply (e.g. a compressor) in the divert system. The actuator assembly 30 includes a generally cylindrical housing 100 having a longitudinal axis 102, an inner wall 104, an open top 106 and an open bottom 108. The open top 106 is provided with a frustoconical cover 110 having a nipple 112 for attachment to an air line 114 (FIGS. 1A, 1B), coupling 115, and an upper relief valve 116. The lower end of the housing 100 is also provided with a nipple 118 for attachment of a coupling 119, a lower relief valve 120 and an air line 122. A piston 124 is slidably mounted for linear sliding contact along the inner wall 104 of the cylinder housing 100, and carries an upper O-ring 126 and a lower O-ring 128 which serves to adequately seal the piston 124, so that a chamber will be created on each side of the piston 124 as it slides in its housing 100. Depending from the piston 124 is an elongated, piston rod 130 having an externally threaded top end 132 and an internally threaded bottom end 134. The top end 132 carries an upper stem ring 135 and is received through a central opening 136 formed in the piston 124 where it is secured by means of a lock nut 138. The bottom end 134 of the piston rod 130 passes through a central aperture 140 extending through a radially stepped foot 142, an upper end of which is joined to the open bottom 108 of the cylinder housing 100 by a circular V-clamp 144. A lower portion of the foot 142 is attached to the top ring 94 of bonnet assembly 28 by a circular clamp 146. An O-ring 148 is provided for sealing purposes between the bottom of the cylindrical housing 100 and the foot 142. In addition, a pair of lower stem rings 150,152 seal the rod 130 at the top and bottom of the foot 142. Upon passing through the foot 142, the bottom end 134 of piston rod 130 is seated in a central hole 154 formed in a bar-like actuator arm 156 which extends through the open sides 90,92 of the bonnet assembly 28. An actuating arm bolt 158 carrying a lock washer 160 is inserted through the hole 154 from the bottom of the arm 156 and is screw threaded into the bottom end 134 of the rod 130. The actuator arm 156 is also provided with a pair of through openings 162,164 at opposite ends thereof for receiving upper threaded ends 166,168 of the actuator stems 52,54 projecting above the bosses 74,76. A pair of lock nuts 170,172 is used to secure the upper threaded ends 166,168 of the stems 52,54 to the actuating arm 156. The assembled divert valve 10 is shown in FIG. 4.

FIG. 5 illustrates the divert valve 10 in a normal flow condition in which the plug assembly 26 is seated in the lower portion 40 of the body assembly 24 with the stems 52,54 extending downwardly into the upper portion 32. In other words, the plug assembly 26 forms a flow control member wherein the disc 48 is slidably mounted in the body assembly 24 below the axially aligned first and second ports 36,38, and the baffling surface 58 extends downwardly from the disc 48 and terminates in the base 42 of the body assembly 24. In the normal flow condition, material flows over the planar upper surface 50 of the disc 48 and around the stems 52,54.

FIG. 6 depicts the divert valve 10 in a divert flow condition wherein the plug assembly 26 is seated in the upper portion 32 of the body assembly 24. That is the disc 48 is movable linearly above the first and second ports 36,38 and the baffling surface 58 is movable with the disc 48 from the base 42 of the body assembly 24 to a position between the first and second ports 36,38. As a result, flow will be diverted from the first port 36 to the third port 43 at the bottom of the body assembly 24. In the divert flow condition, the stems 52,54 are pulled up into the tower 72 of the bonnet assembly 28.

In accordance with the invention, the plug assembly 26, acting as the flow control member is slidably and non-rotatably mounted for linear movement relative to the inner wall 44 of the body assembly 24 along the longitudinal axis 46 thereof. The divert valve 10 operates to selectively regulate the flow through the first, second and third ports 36,38,43 respectively, using the two different structures of the disc 48 and the baffling structure 58.

In the use of the preferred embodiment, as previously described in FIG. 1A, the solenoid 20 fed by pressurized air supply has one air line 114 connected to a top connector 174 on the upper relief valve 116 and another separate line 122 connected to a bottom connector 176 on the bottom relief valve 120. In this application, lumps of cheese curds are blown through the processing line 12. Under normal flow conditions, the curds flow freely to the divert valve 10 passing over the upper surface 50 of the disc 48 as they flow directly from the source or first processing station 14 through the first and second ports 36,38 and onto at least a dryer 16 or second processing station. In the normal flow condition, the solenoid 20 regulates the delivery of air to the upper chamber in the actuator housing 100 so as to keep the piston 124 at a lowermost position and similarly maintain the plug assembly 26 in its lowermost position. Upon detection of any metal contaminants, the solenoid 20 will quickly send air to the bottom chamber in actuator housing 100. This causes a piston 124, piston rod 130, stems 52,54 and plug assembly 26 to rise so that material flow to the second port 38 is temporarily blocked and instead diverted downwardly by the baffling surface 58 through the third port 43. In this case, the plug assembly 26 is designed to respond in a very short period, typically 0.1 second, so that a minimum of cheese curds accompanying the metal contaminants is dumped to the refuse container 22. Once detection has occurred, the solenoid 20 acts again to send air to the upper chamber of the actuator assembly 30 so that the valve will again assume the normal flow condition.

It should be understood that at least the body assembly 24 and the plug assembly 26 are fabricated from stainless steel having fine surface finishing to minimize adherence to the cheese curds. The formation of the smooth disc 48 and smooth baffling surface 58 avoids sharp corners, crevices and inaccessible voids in screw threads which can cause clogging. It is also important to note that the surface finish of the disc periphery is maintained by the small spacing between the disc periphery and the inner wall 44 of the body assembly 24.

In contrast with prior art valves which need to be disassembled before cleaning, the divert valve 10 is capable of being cleaned-in-place (CIP) without dismantling. Such cleaning of divert valve 10 typically involves an acid rinse, a caustic wash and a clear rinse using water temperatures in the 170° F. to 250° F. range. Economy of cleaning is obtained since all CIP cycles can be performed on the on the processing line 12.

The present invention thus provides a unique divert valve which translates the linear movement of the piston and piston rod from an actuator assembly into linear movement of a flow control member in a body assembly through which material flow is directed. This valve construction is particularly responsive to a sensed condition to temporarily alter flow before returning to a normal flow condition.

While the invention has been described with reference to a preferred embodiment, those skilled in the art will appreciate that certain substitutions, alterations and omissions may be made without departing from the spirit thereof. Accordingly, the foregoing description is meant to be exemplary only, and should not be deemed limitative on the scope of the invention set forth in the following claims.

We claim:

1. A divert valve comprising:
   a hollow body assembly having first and second ports axially aligned and a third port extending generally perpendicularly to the first and second ports;
   a plug assembly slidably mounted for linear movement within the valve body; and
   an actuator assembly positioned exteriorly of the body assembly and operably connected with the plug assembly such that in one position, the plug assembly allows communication between the first and second ports, and in a second position, the plug assembly allows communication between the first and third ports;
   wherein the body assembly has a longitudinal axis, a generally cylindrical inner wall, an open top and an open bottom forming the third port; and
   wherein the plug assembly includes a generally cylindrical disc slidably mounted relative to the inner wall of the body assembly for linear movement along the longitudinal axis, a pair of parallel, spaced apart stems extending upwardly from the disc and a baffling surface projecting downwardly from the disc.

2. The divert valve of claim 1, wherein the body assembly includes a pair of outwardly projecting ears, one of the ears defining the first port and the other of the ears defining the second port.

3. The divert valve of claim 1, wherein the baffling surface has a partial cylindrically shaped rear surface and a downwardly sloping front surface.

4. The divert valve of claim 3, wherein the downwardly sloping front surface includes a central triangularly shaped region provided with a pair of outwardly sweeping wings.

5. The divert valve of claim 1, wherein the actuator assembly includes a cylinder housing having an inner wall, a cover attached to a top portion and a foot connected to a bottom portion by a first circular clamp.

6. The divert valve of claim 5, wherein a piston is slidably mounted for linear movement along a longitudinal axis in the cylinder housing, the piston being provided with a downwardly extending rod projecting through the foot.

7. The divert valve of claim 6, wherein the rod has a free end connected to an actuating arm which is connected to the stems of the plug assembly.

8. The divert assembly of claim 6, including second and third sealing devices positioned between the piston and the inner wall of the cylinder housing.

9. The divert valve of claim 5, including a bonnet assembly extending between the body assembly and the actuator assembly.

10. The divert valve of claim 9, wherein the bonnet assembly includes a circular base and a generally cylindrical tower projecting upwardly therefrom, the tower having open sides and a top ring which is lockingly engageable with the actuator assembly by means of a second circular clamp.

11. The divert valve of claim 10, wherein the base of the bonnet assembly is attached to the open top of the body assembly by a third circular clamp and is formed with a pair of diametrically opposed openings through which the plug assembly stems pass.

12. The divert valve of claim 11, including a first sealing device interposed between the base of the bonnet assembly and the open top of the body assembly.

13. In a three-way, flow valve having a body assembly including first and second axially aligned ports and a third port extending generally perpendicularly to the first and second ports, the improvement residing in:
   a flow control member slidably positioned for linear movement within the body assembly for selectively regulating flow through the first, second and third ports, the flow control member having a first structure for permitting normal flow between the first and second ports, and a second structure for diverting flow from the first port to the third port;
   wherein the first structure is comprised of a generally cylindrical disc slidably mounted within the body assembly below the first and second ports during normal flow, and the second structure is comprised of a baffling surface extending downward from the disc and terminating at a lower portion of the body assembly, the baffling surface having a partial cylindrically shaped rear surface and a downwardly curved, sloping front surface having a central triangularly shaped region flanked on each side by a pair of outward sweeping wings.

14. A fluid controlled divert valve for normally regulating material flow from a source to a first processing station, and diverting material flow from the source to a second processing station in response to a sensed condition downstream of the source, the divert valve comprising:

- a body assembly having an inlet port in communication with the source, a first outlet port in communication with the first processing station and a second outlet port in communication with the second processing station;
- a flow controlling plug assembly slidably and non-rotatably mounted for movement along a longitudinal axis of the body assembly, the plug assembly including a generally cylindrical disc over which material normally flows from the source to the first outlet port and further processing station, the plug assembly further including a baffling surface depending from the disc, the baffling surface being constructed and arranged to selectively divert material flow from the source to the second outlet port and second processing station in response to the sensed condition downstream of the source; and
- a fluid-actuated actuator assembly associated with the body assembly and responsive to the sensed condition, the actuator assembly having a closed cylinder, a piston slidably mounted for linear movement in the cylinder, a piston rod operably connected between the piston and the plug assembly disc, a first fluid intake for selectively admitting fluid on one side of the piston and a second fluid intake for selectively admitting fluid on an opposite side of the piston, the admission of fluid causing the linear movement of the piston to be translated to linear movement of the plug assembly so as to selectively enable flow between the first processing station and the second processing station;
- wherein the baffling surface has a partially cylindrically shaped rear surface and a downwardly curved sloping front surface having a central triangularly shaped region flanked on each side by a pair of outwardly sweeping wings.

15. The divert valve of claim 14, wherein at least the body assembly and the plug assembly are constructed of stainless steel.

* * * * *